United States Patent [19]

Egerton

[11] Patent Number: 5,190,359

[45] Date of Patent: Mar. 2, 1993

[54] PRESSURE RELIEF VALVE FOR RAILWAY BRAKE EMERGENCY SYSTEMS

[75] Inventor: Gary W. Egerton, Silver Spring, Md.

[73] Assignee: Pulse Electronics, Incorporated, Frederick, Md.

[21] Appl. No.: 841,382

[22] Filed: Feb. 25, 1992

[51] Int. Cl.⁵ .............................................. B60T 15/02
[52] U.S. Cl. ....................... 303/86; 137/237; 137/244; 303/68; 303/81
[58] Field of Search ........................ 303/86, 81, 68, 69, 303/47; 137/102, 242, 237, 549, 243.1, 243.2, 243, 244; 251/30.02, 30.01, 46, 26, 129.21; 188/152

[56] References Cited

U.S. PATENT DOCUMENTS

| 2,874,930 | 11/1954 | Ray et al. |
| 3,424,185 | 11/1966 | Lansky et al. |
| 4,081,171 | 3/1978 | Morgan et al. |
| 4,360,037 | 11/1982 | Kendall |
| 4,505,450 | 3/1985 | Saarem et al. |
| 4,596,265 | 6/1986 | Goodell |
| 4,641,892 | 2/1987 | Schmid |
| 4,878,513 | 11/1989 | Ashby et al. |
| 4,974,911 | 12/1990 | Hart ............................ 303/86 X |
| 4,981,280 | 1/1991 | Brandenberg |
| 5,044,555 | 9/1991 | Youngeberg et al. ......... 137/244 X |
| 5,113,895 | 5/1992 | LeDevehat ...................... 137/244 |

FOREIGN PATENT DOCUMENTS 412491 4/1966 Switzerland ...................... 137/244
813916 5/1959 United Kingdom .

Primary Examiner—Douglas C. Butler
Attorney, Agent, or Firm—Whitham & Marhoefer

[57] ABSTRACT

A pressure relief valve for a railway emergency brake system that is simple in construction, easy to manufacture and to assemble and that, in operation, is self-cleaning of brake pipe dirt and debris. The inventive valve comprises a valve body having a hollow space being divided by a diaphragm into a first and a second chamber. Chambers are coupled via an orifice in the diaphragm, coupling pressure from the first chamber to the second. The valve comprises a peg aligned with the orifice, penetrating and cleaning the latter when the diaphragm moves from a closed position into an open position.

10 Claims, 2 Drawing Sheets

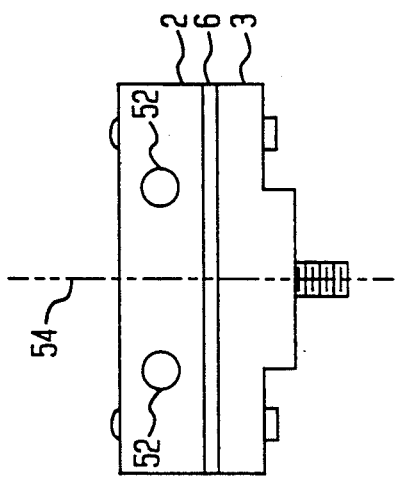
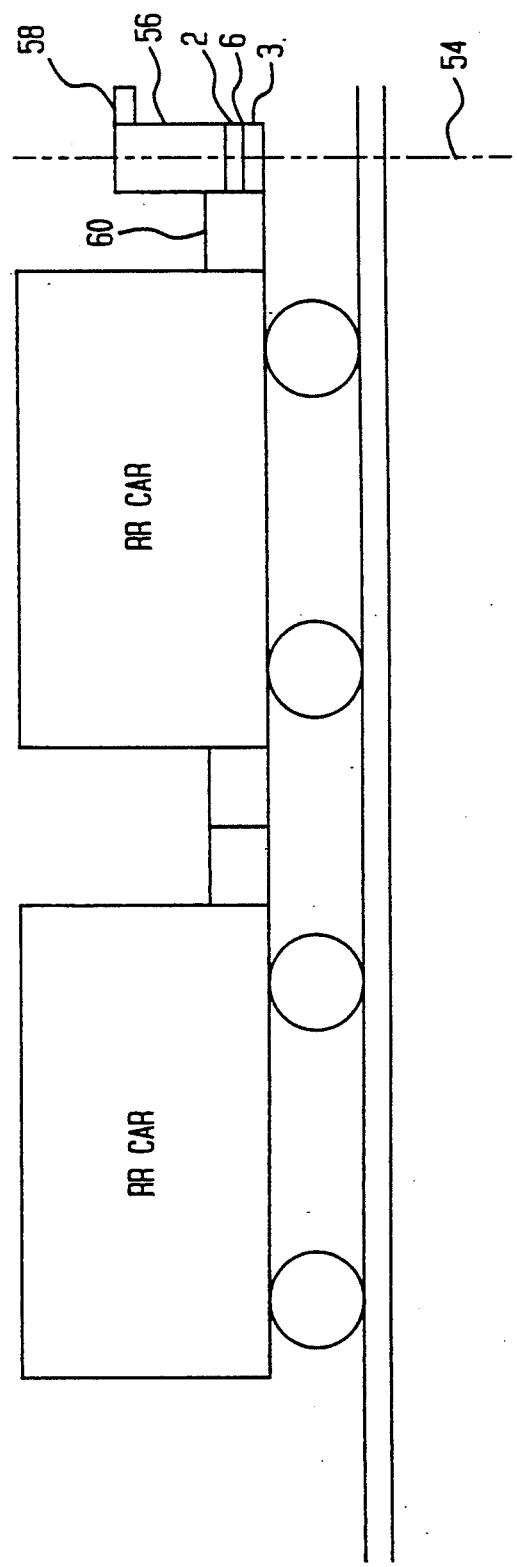
FIG. 3
FIG. 4

PRESSURE RELIEF VALVE FOR RAILWAY BRAKE EMERGENCY SYSTEMS

BACKGROUND OF THE INVENTION

1. Field of the Invention

This invention relates to a pressure relief valve for brake pressure pipes in railway brake emergency systems, and more particularly an improved self-cleaning diaphragm valve of the type that is actuated by a solenoid-operated pilot valve.

Solenoid-operated diaphragm valves are used as emergency brake control valves in emergency brake systems. In a railway train each vehicle is fitted with a brake pipe extending along the length of the vehicle. The brake pipes of each vehicle of a train are interconnected to each other to form a continuous brake pipe extending from the locomotive to the last vehicle. The continuous brake pipe provides pressurized air to each vehicle, causing the pistons in the brake cylinders at each car to be withdrawn to effect a full brake release. In case of an emergency, the pressure in the brake pipe is lowered quickly to actuate the pistons, thereupon causing brake action.

A number of things can block the brake pipe. Water can collect and freeze in the low lying glad-hand joints. Each car has brake pipe valves that can rotate shut. If the brake pipe is, for example, blocked in the middle of the train and air is bled through a valve situated at the front of the train, the drop of pressure in the rear part of the brake pipe, i.e. behind the block, may not be sufficient to actuate the brake pistons.

For this reason, brake emergency control valves that can be remotely actuated are situated at the end of the brake pipe to enable the locomotive engineer to relieve pressure from the rear end of the brake pipe as well as the front end, thereby assuring fast function of emergency braking system.

However the dirt and debris in the brake pipe can interfere with the proper function of prior art emergency brake pressure relief valves situated at the end of the train.

Description of the Prior Art

Valves of the type described above or similar valves are disclosed in the following patents.

U.S. Pat. No. 4,981,280 to Brandenberg shows a solenoid actuated fluid valve. Inlet pressure enters through a restricted orifice into a chamber on one side of a diaphragm, acts against the diaphragm and causes the valve to close. When the solenoid or pilot valve operated bleed orifice is actuated, the chamber is depressurized and the fluid valve opens. Dirt and debris can clog the restricted orifice that couples upstream fluid pressure to the chamber.

U.S. Pat. No. 4,878,513 to Ashby et al. shows a quick vent valve for an air brake line. A flexible diaphragm valve is positioned between a main valve seat and an exhaust seat. Pressurized air at the inlet port deflects the diaphragm away from the main seat and seals it against the exhaust seat. A higher pressure at the delivery port moves the diaphragm away from the exhaust seat and against the main seat. This valve is therefore not actuated by a pilot valve and not suitable for the use in a railway emergency brake system.

U.S. Pat. No. 4,596,265 to Goodell shows a quick release valve employing a flexible diaphragm. A bead circumvents the inlet port to provide a valve seating area for the flexible diaphragm. The height of an apex is chosen so that the diaphragm is located against the bead with sufficient force to prevent the diaphragm from oscillating. Like the Ashby valve, the Goodell valve is not suitable for the use in an railway brake emergency system, since it is not remotely pilot valve actuated.

U.S. Pat. No. 4,505,450 to Saarem shows a solenoid-operated pilot-actuated valve. The valve is adapted to control large amounts of flow energy with a small control signal, e.g. for irrigation purposes. A bleed tube extends upwardly through a diaphragm guide into a chamber above the diaphragm. The diaphragm assembly has an internal metal cup-shaped reinforcing member. The structure of the Saarem valve is complicated and expensive to manufacture due to numerous parts. A sustaining member for the periphery of the diaphragm in form of an annular divider is necessary, in order to protect the diaphragm against stresses.

U.S Pat. No. 4,360,037 to Kendall shows a self cleaning filter assembly for a solenoid actuated valve, the self cleaning filter assembly comprises a relatively rigid filter element for filtering and a plurality of scraper blades mounted for scraping dirt, grit or the like from the filter element each time the valve is opened or closed. The Kendall valve comprises a very complex structure, expensive and difficult to manufacture.

U S. Pat. No. 4,081,171 to Morgan et al. shows a self-cleaning filter assembly for solenoid-actuated valves quite similar to that of Kendall.

U.S. Pat. No. 3,424,185 to Lansky et al. shows a quick exhaust valve. The flexible diaphragm is adequately supported and guided against excessive movement and deformation so as to provide a long life. The Lansky valve is designed to be used with a fluid pressure operated motor.

U.S. Pat. No. 2,874,930 to Ray et al. shows a pilot controlled diaphragm valve. The diaphragm assembly comprises a mainly flexible, circular diaphragm and an stiffening plate secured by a rivet to the center of the flexible diaphragm.

British Pat. No. 813,916 to Clausen shows a pilot-valve controlled diaphragm valve for fluids. An orifice is provided in the diaphragm for communicating pressure from the inlet side to the pressure chamber.

U.S. Pat. No. 4,641,892 to Schmid shows an emergency brake control valve that is incorporated in a glad hand body, which can be coupled at the last coupling at the end of the brake pipe. This valve comprises two diaphragms, which are secured to a valve member. The pressure pipe is connected central to the valve, with the exhaust port forming an annular area at the periphery of the valve. This configuration causes an unbalanced pressure distribution, the latter inducing stresses into the diaphragm. In case of diaphragm-failure, the Schmid-valve will tend to open causing an undesirable emergency application of the brakes. Further, the valve is damage prone since it is attached to the glandhand and also tends to trap condensate that can freeze and cause a malfunction.

SUMMARY OF THE INVENTION

It is an object of the invention to provide a pressure relief valve for a railway emergency brake system which is simple in construction, easy to manufacture and to assemble. A further object is the provision of a pressure relief valve that has a low diaphragm stress and which in case of malfunctioning of the diaphragm will keep the exhaust port for the brake pressure pipe closed. That is, in the case of a diaphragm failure, the pressure to the brakes will be maintained and the brakes will not be applied. A still further object of the invention is the provision of a valve that, in operation, is self-cleaning of brake pipe dirt and debris. Yet another object is the provision of a valve that is in an end-of-train unit and drains condensate when the unit is in its normal upright position.

A pressure relief valve according to the invention comprises a valve body, comprising a first and a second concave wall defining a hollow space divided by a diaphragm into a first chamber and a second chamber. The diaphragm, the chambers and the walls have a common geometrical axis.

The first chamber has a passageway situated on its periphery for connection to the train brake pressure pipe. The first chamber further has an exhaust port which is aligned with the geometrical axis, i.e. the port is arranged in the center of the chamber. The exhaust port is surrounded by a flange forming a valve seat.

The second chamber is coupled via an off-axis orifice in the diaphragm to the first chamber. Therefore the second chamber is pressurized by the pressure of the upstream fluid and the diaphragm is urged against said valve seat to close the exhaust port. The middle portion of the diaphragm engages the valve seat. In a preferred embodiment of the invention this middle portion is reinforced by a metal plate.

The diaphragm metal plate is subject to the brake pipe pressure on its back side and to atmospheric pressure on its front side.

The resultant force is directed towards the exhaust port and seals the port. The area of the exhaust port is relatively small and a metal plate reinforced diaphragm can easily bear the stresses induced therein. The annular area of the diaphragm, which surrounds the middle portion of the diaphragm, faces equal pressure on its front and back. Consequently, the unreinforced area of the diaphragm bears no stress when the valve is closed. This minimizes the risk of valve rupture. Furthermore, in the event the valve ruptures, the valve does not open and produce undesired emergency braking.

The orifice coupling the brake pressure to the second chamber and to the backside of the diaphragm is situated in the diaphragm itself. It is therefore possible to design the orifice with a depth in the order of its diameter, i.e. the orifice is comparatively short. Consequently dirt and debris are less likely to lodge in the orifice than other valves with orifices in the form of long channels.

An opening is situated in the second wall connecting the second chamber to an outlet by way of a pilot valve. Pressure in the second chamber is reduced by activating the pilot valve, thus letting the diaphragm lift off the valve seat, allowing the medium contained in the pressure pipe to flow through the exhaust port, thereby reducing pressure in the brake pipe. The outlet and the pilot valve opening are of greater diameter than the diameter of the orifice so that pieces of dirt blown through the orifice will tend to be blown through the opening and the outlet. Thus the valve according to the invention incorporates a self cleaning function and not susceptible to be clogged and choked by dirt or debris.

Furthermore, a peg aligned with the diaphragm orifice is situated on the second wall. The peg penetrates the orifice every time the diaphragm lifts from the closed position, i.e. lifts the reinforced middle portion from the valve seat. Accordingly the orifice is cleaned by the peg each time the diaphragm lifts.

The peg also partially but substantially plugs the orifice when the valve is open, thereby minimizing the dirt and debris flowing through the orifice and other parts of the valve. The peg also reduces pressure in the second chamber ensuring that the valve opens fully, with the surface of the diaphragm substantially against the wall of the second chamber. This further minimizes flow in the second chamber with the valve in its open position.

BRIEF DESCRIPTION OF THE DRAWINGS

The foregoing and other objects, aspects and advantages will be better understood from the following detailed description of a preferred embodiment of the invention with reference to the drawings, in which:

FIG. 3 is an external side elevation view of the valve shown in FIGS. 1 and 2.

FIG. 4 is a schematic drawing showing the valve of this invention mounted in an end-of-train unit.

DETAILED DESCRIPTION OF A PREFERRED EMBODIMENT OF THE INVENTION

Figure 1:
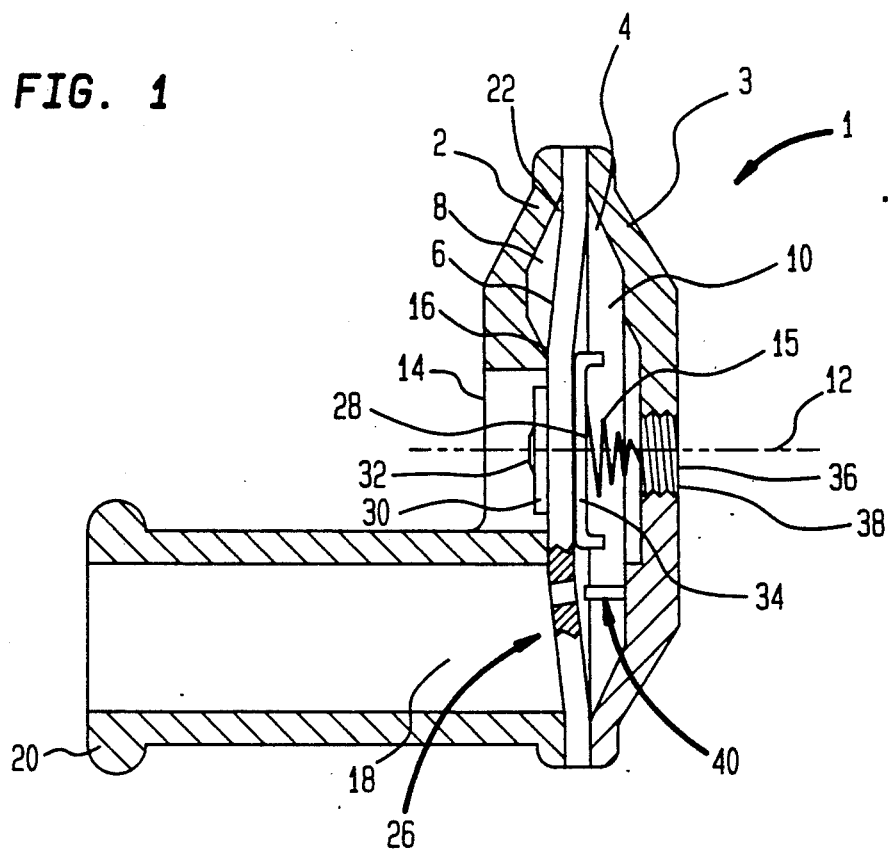
FIG. 1 is a cross-section of an embodiment of the valve according to the invention with the diaphragm in the closed position.

Referring now to the drawings, and more particularly to FIG. 1, a valve indicated by the by the reference numeral 1 has a first body member 2 concave wall and a second body member 3 concave wall defining in combination a hollow space 4. A diaphragm 6 sandwiched between the body members divides the hollow space 4 into a first chamber 8 and a second chamber 10. The walls 2, 3, the chambers 8, 10 and the diaphragm 6 have a common geometrical axis 12.

The first chamber 8 has an exhaust port 14 situated in said first wall 2 aligned with said common axis 12. A flange surrounds the exhaust port on the inner side of wall 2 and forms a valve seat 16. A coil spring 15 is situated between the diaphragm 6 and the second wall 3 and urges the diaphragm against the valve seat 16.

The first chamber 8 has a passageway 18 leading to a pressure pipe (not shown) of the brake system of the train to which the valve is coupled. To connect the passageway to the pressure pipe or to a pressure hose the passageway comprises a connector 20. The passageway 18 is connected to an annular groove 22 in the first wall 2. The annular groove contributes firstly to an equal pressure distribution on the surface of diaphragm 6 and secondly reduces flow resistance between passageway 18 and exhaust port 14 once the valve is opened.

When the valve is connected to the pressure pipe of the train via connector 20, pressurized air fills first chamber 8. An orifice 26 in diaphragm 6 couples pressure from first chamber 8 to second chamber 10.

A pressure difference exists across the middle portion of the diaphragm 6. Full brake pressure (e.g. 85 psi) from chamber 10 acts on the backside of the diaphragm and is opposed by atmospheric pressure on the front side (i.e. the left side in FIG. 1). This pressure difference creates a force that urges diaphragm 6 into sealing contact with valve seat 16.

A metal plate 28 reinforces the middle portion of diaphragm 6. Stresses in the middle portion are easily resisted by the metal parts and the rubber parts remain unstressed. Metal plate 28 is secured to the diaphragm by means of a washer 30 and a rivet 32, by cementing, or the like.

The edge of metal plate 28 is bent up to form a bead 34. The bead 34 centers coil spring 15. In this way metal plate 28 acts as an abutment for coil spring 15.

Figure 2:
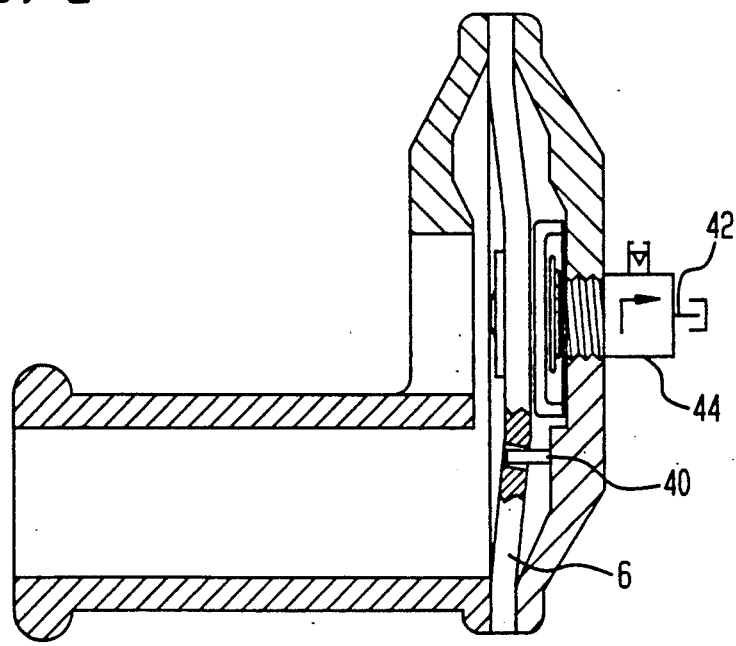
FIG. 2 is the same cross-section of the valve according to FIG. 1 with the diaphragm in the open position.

The second wall 3 defining the second chamber 10 has an opening 36 with a thread 38 to fix a pressure hose, the latter connecting the second chamber to an outlet 42 via a solenoid-controlled pilot valve 44 (shown in FIG. 2). When the pilot valve is actuated, air in the second chamber escapes through opening 36, thereby reducing pressure in the second chamber. The pressure in the second chamber will be reduced more quickly than in first chamber 8, since orifice 26 acts as a throttle valve. With pressure in first chamber 8 higher than the pressure in the second chamber 10, diaphragm 6 lifts from its seat 16 to the position shown in FIG. 2, thereby allowing the air contained in the brake pressure pipe of the train to escape through exhaust port 14.

It will be noticed that the flexible part of the diaphragm, i.e. the annular area encircling the reinforced middle portion, is subjected to the same pressure on both sides when the valve is closed and therefore is only lightly stressed. When the valve is open, the flexible portion of the diaphragm experiences a differential pressure. Since the valve is closed over ninety percent of the time, the flexible portion of the diaphragm is mostly unstressed, contributing to its reliability in operation.

In case the diaphragm fails, the valve stays in the closed state, since a fissure in the diaphragm will not disturb the equivalence of pressure on both sides of the diaphragm as set out above.

It will be noticed that the depth of orifice 26 is preferably in the order of its diameter. This feature contributes to what could be called self cleaning ability of the valve. Since dirt or debris being in the brake pressure pipe of a train being connected to connection piece 20 is the rule rather than the exception, the orifice 26 for coupling pressure from one side of the diaphragm to the other is endangered to be clogged. The shallow depth, i.e. the shortness of the channel through which dirt or debris is to be blown, contributes to reducing the danger of the orifice being clogged.

The opening 36 is of larger diameter than orifice 26 to ensure that pressure is reduced quickly in the second chamber 10 in case of the pilot valve being actuated and to ensure that dirt or debris blown through orifice 26 will be removed from second chamber 10 by the air flow through opening 36.

Referring now to FIG. 2 a peg 40 aligned with orifice 26 is secured to the second wall 3. When the diaphragm 6 lifts from valve seat 16 and moves towards second wall 3 the peg 40 will penetrate orifice 26, thereby expelling any dirt or debris contained therein. Further, it should be noted that in this position the peg substantially blocks the orifice, preventing debris from entering the chamber and also maintaining a low pressure in the chamber.

FIG. 3 shows an external view of the valve. The diaphragm 6 is sandwiched between the body members 2 and 3 which are held together by bolts 50. A means of attaching such screw holes or lugs 52 are provided to mount the valve to an end-of-train unit of the type commercially available from Pulse Electronics, Inc., the assignee of this invention. It should be noted that lugs 52 mount the valve on the end-of-train unit so that an axis 54 perpendicular to the plane of the diaphragm 6 is orientated vertically when the end-of-train unit is mounted in its upright position on a railroad car. This allows condensation in the upper chamber to drain through the orifice 26.

FIG. 4 shows the valve mounted on an end-of-train unit 56 with diaphragm axis 54 vertically orientated. The end-of-train unit 56 is secured to the railroad car coupler 60 in a standard fashion well known to those skilled in the art. A light 58 with a directional beam is secured to the end-of-train unit. When the end-of-train unit is secured to the car coupler in its proper upright position, the directional beam is orientated relative to the end-of-train unit so that it projects along the track when the end-of-train unit is in its proper upright position. By an operator viewing the light from a distance along the track, a determination can be made that the end-of-train unit is in its proper, upright position.

While the invention has been described in terms of a single preferred embodiment, those skilled in the art will recognize that the invention can be practiced with modification within the spirit and scope of the appended claims.

Having thus described my invention, what I claim as new and desire to secure by Letters Patent is as follows:

1. A railroad emergency-brake, pressure relief, valve mounted on a railroad end-of-train unit, comprising in combination:
   a valve body having a first wall and a second wall defining a hollow space;
   a flexible diaphragm extending across said hollow space dividing said hollow space into a first chamber and a second chamber;
   said diaphragm having an axis perpendicular to the plane of said diaphragm;
   a first chamber having an exhaust port in said first wall, said exhaust port surrounded by a flange forming a valve seat in said first chamber;
   said flexible diaphragm movable between a first position in which said diaphragm engages said valve seat with a middle portion of said diaphragm covering said exhaust port and a second position in which said diaphragm is disposed away from said valve seat, uncovering said exhaust port;
   said first chamber further having a brake pressure port;
   an orifice in said diaphragm providing a fluid pressure coupling between said first chamber and said second chamber so that brake pipe pressure is communicated to said second chamber and deflects said diaphragm to its first position, whereby said exhaust port remains closed so long as brake pipe pressure in said second chamber is exerted on said diaphragm;
   a pilot valve port in said second wall for connecting the second chamber to a pilot valve, whereby opening said pilot valve reduces pressure in said second chamber so that said diaphragm lifts off said valve seat and moves to said second position; and
   said valve secured in an end-of-train unit so that said diaphragm axis is in a vertical orientation when said end-of-train unit is in its operating position, whereby in operation condensation in said second chamber can drain through said orifice.

2. A railroad emergency-brake, pressure relief valve as in claim 1, further including a peg in said second chamber disposed to penetrate said orifice when said diaphragm is disposed away from said first position, whereby said orifice is cleaned each time said exhaust port is uncovered by said diaphragm.

3. A railroad emergency-brake, pressure relief valve as in claim 1, wherein said middle portion of said diaphragm is reinforced to the point that it is substantially rigid.

4. A railroad emergency-brake, pressure relief valve as in claim 1, wherein said middle portion of said diaphragm is a metal plate.

5. A railroad emergency-brake, pressure relief valve as in claim 2, wherein said peg substantially blocks said orifice when said diaphragm is disposed away from said first position, thereby further reducing pressure in said second chamber.

6. A railroad emergency-brake pressure relief valve as in claim 1, further including means secured to said end-of-train unit to determine when said end-of-train unit is in an upright position.

7. A railroad emergency-brake pressure relief valve adapted for mounting on a railroad end-of-train unit, said valve comprising:

a valve body having a first wall and a second wall defining a hollow space;

a flexible diaphragm extending across said hollow space dividing said hollow space into a first chamber and a second chamber;

said first chamber having an exhaust port in said first wall, said exhaust port surrounded by a flange forming a valve seat in said first chamber;

said flexible diaphragm movable between a first position in which a peripheral region encompassing a middle portion of the diaphragm engages said valve seat, closing said exhaust port, and a second position in which said diaphragm is disposed away from said valve seat, opening said exhaust port;

said first chamber further having a brake pressure port;

an orifice in said diaphragm providing a fluid pressure coupling between said first chamber and said second chamber, brake pipe pressure in said second chamber deflecting said diaphragm to its first position with said peripheral region engaging said valve seat, whereby said exhaust port remains closed so long as said second chamber exerts brake pipe pressure on said diaphragm;

pilot valve port in said second wall for connecting the second chamber to a pilot valve, whereby opening said pilot valve reduces pressure in said second chamber so that said diaphragm lifts off said valve seat and moves to said second position;

a peg in said second chamber disposed to penetrate said orifice when said diaphragm is disposed away from said first position, whereby said orifice is cleaned each time said exhaust port is uncovered by said diaphragm.

8. A railroad emergency-brake pressure relief valve as in claim 7, wherein said middle portion of said diaphragm is reinforced to the point that it is substantially rigid.

9. A railroad emergency-brake pressure relief valve as in claim 7, wherein said middle portion of said diaphragm is a metal plate.

10. A railroad emergency-brake pressure relief valve as in claim 7, wherein said peg substantially blocks said orifice when said diaphragm is disposed away from said first position, thereby further reducing pressure in said second chamber.

* * * * *